United States Patent [19]

Asche

[11] Patent Number: 4,506,199
[45] Date of Patent: Mar. 19, 1985

[54] AGRICULTURAL FAN CONTROL SYSTEM

[76] Inventor: Bernard J. Asche, Rte. 4, Willmar, Minn. 56201

[21] Appl. No.: 454,037

[22] Filed: Dec. 28, 1982

[51] Int. Cl.$^3$ .............................................. G05B 5/00
[52] U.S. Cl. .................................. 318/313; 318/399; 318/334; 318/473
[58] Field of Search ............... 318/334, 471, 472, 473, 318/399, 313, 312, 806, 480; 62/180, 183, 184, 186

[56] References Cited

U.S. PATENT DOCUMENTS

| | | | |
|---|---|---|---|
| 3,119,055 | 1/1964 | Martin | 318/471 X |
| 3,702,431 | 11/1972 | Pinckaers | 318/471 |
| 3,749,992 | 7/1973 | Jones | 318/473 X |
| 3,801,888 | 4/1974 | Faulkner | 318/471 |
| 3,896,359 | 7/1975 | Olander et al. | 318/473 X |
| 4,075,865 | 2/1978 | Wills | 318/472 X |
| 4,093,899 | 6/1978 | Denny | 318/334 |
| 4,168,456 | 9/1979 | Isobe | 318/473 X |
| 4,276,506 | 6/1981 | Little | 318/806 |
| 4,325,225 | 4/1982 | Price | 62/180 X |

OTHER PUBLICATIONS

F. J. Hyde, Thermistors, London Iliffe Books, 1971, pp. 22-33.

*Primary Examiner*—Ulysses Weldon
*Attorney, Agent, or Firm*—Hugh D. Jaeger

[57] ABSTRACT

Agricultural fan control system for controlling operation of fan in an agricultural installation including a thermostat temperature control, a manual constant speed adjustment temperature control, and an automatic variable fan speed with a minimum temperature setting. The control system is fully enclosed in a dust-proof, waterproof box with a spring-loaded cover for use in a barn. The sensor unit can be remote from the control unit, and accounts for a seven-degree fahrenheit temperature rise on modulating setting from minimum to maximum c.f.m. Voltage curve of the electrical system is inverted and slower so that there is a slower fan speed increase on the first five degrees than on the last two degrees temperature-wise. The system includes a minimum setting allowing for a constant minimum air movement while including a manual setting for maintaining constant maximum air movement. The c.f.m. to heat requirements is adjusted accordingly between 45°–110° F. The system will handle one or more fan units operating on either 110 or 220 line voltage VAC.

3 Claims, 3 Drawing Figures

AGRICULTURAL FAN CONTROL SYSTEM

BACKGROUND OF THE INVENTION

1. Field of the Invention

The present invention pertains to an agricultural electrical control system, and, more particularly, pertains to an agricultural fan control system where the fans are utilized in barns or other agricultural buildings.

2. Description of the Prior Art

The prior art agricultural fan control systems have suffered from two major deficiencies. The first deficiency is that the systems were never intended to handle more than one fan motor unit and therefore were strictly limited in application in a large agricultural building typical of that found on the farms. The units were only intended to handle a single unit fan assembly, which was less than desirable considering the fact that sufficient air can sometimes not be moved by one fan assembly, the units were not flexible enough or modulated to control building temperature, and the systems would not accurately maintain a desired temperature range or desired movement of cubic feet of air through the agricultural building.

A second major deficiency of the prior art systems was that the systems were not protected against the elements of the environment, such as dust and moisture, and were forever requiring maintenance and repair which was less than desirable for the typical farmer, such as the midwestern farmer with little electrical or agri-electrical background.

Some of the deficiencies with the other units were that a specialized installation was required which was not available to the typical farmer or agricultural environment, the expense of the installation was prohibitive to the facility such as the barn and the individual, as the farmer, and the system while sometimes having all of the "bells and whistles" failed in the end to truly modulate the fan or fans in maintaining a desired temperature and moving a desired amount of air through the agricultural building.

The present invention overcomes the disadvantages of the prior art by providing an economical, totally enclosed agricultural fan control system which passes all national electrical codes and provides three types of temperature control through a thermostat, manual control, and automatic variable speed with minimum setting.

SUMMARY OF THE INVENTION

The general purpose of the present invention is to provide an agricultural fan control system having three types of temperature control of thermostatic setting, manual constant speed adjustments, and automatic variable speed with a minimum setting for an operating range of 45° to 110° F. and for handling one or more fan units on either 110 or 220 line voltage. The unit is totally enclosed in a dustproof, waterproof box providing that an entire agricultural building such as a barn can be washed down without affecting in any way the agricultural fan control system.

According to one embodiment of the present invention, there is provided an agricultural fan control system including a modulator electrical unit with a low-voltage control system, a high-voltage regulator circuit connected to a motor, and an LED-photocell optical control circuit coupling the low-voltage control circuit to the high-voltage power circuit, a thermister sensor connected in the low-voltage circuit, and at least one or a plurality of fan units connected across a phased fired triac in the high-voltage circuit, a speed adjustment in the high-voltage circuit, the temperature sensor positioned in the environment of the agricultural building adjacent to the electrical control system, the one or more than one fan unit positioned in the agricultural building, the modulator electrical control circuit of the agricultural fan control system including a thermostat switch and a speed adjustment switch, the modulator electrical control circuit including provisions for thermostatic temperature control, manual constant speed adjustment for the fan, an automatic variable speed with a minimum temperature sensing, whereby the system provides for a slower fan speed increase on the first five degrees on temperature than on the last two degrees of temperature rise fahrenheit, provides a minimum setting which allows a constant minimum air movement, and has a manual setting for maintaining the constant maximum cubic feet per minute of air movement thereby providing an operating range of 45°–110° F.

One significant aspect and feature of the present invention is an agricultural fan control system, trademarked as "MODU-STAT", providing three types of temperature control of thermostatic, manual constant speed adjustment of a fan, and automatic variable speed adjustment of the fan with minimum setting.

Another significant aspect and feature of the present invention is providing a slower fan speed increase on the first five degrees of temperature than on the last two degrees of temperature rise fahrenheit. This has a great advantage where supplementary heat is needed so that the fan does not waste heat source and waste fuel.

A further significant aspect and feature of the present invention is a manual setting of the system so that a constant maximum air movement can be maintained, which is very important where auxiliary heat such as brooder stoves is used. In this way air movement can be matched to heat requirements.

An additional significant aspect and feature of the present invention is a broad temperature range of 45°–110° F.

Having thus described one embodiment of the present invention, it is a principal object hereof to provide an agricultural fan control system for use in an agricultural environment, such as a barn, having one or more fans for maintaining temperature as well as air flow through the barn.

Another object of the present invention is to provide a fan control which is totally enclosed in a waterproof, dustproof box so that a barn can be washed down without affecting the agri-electronics.

A further object of the present invention is an agricultural fan control system which handles one or more fan units, operates on line voltage of either 110 or 220 VAC, and providing for external wire hookup with color-coded wires which can be installed by the average individual farmer, not requiring a professional electrician or agri-electronic expert.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
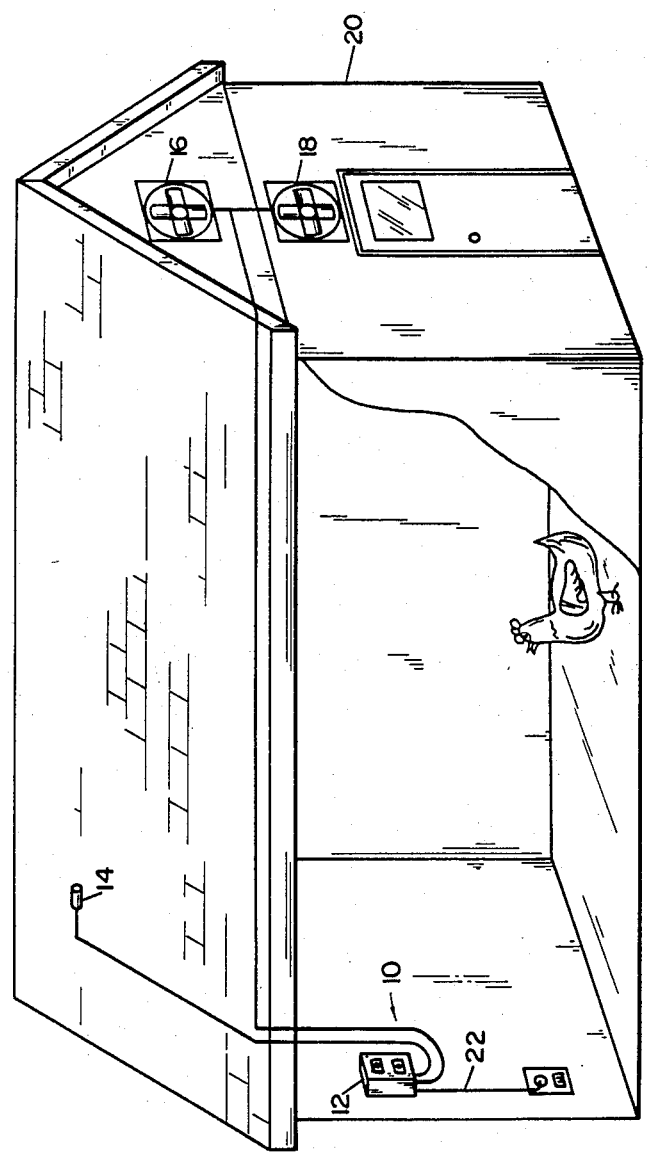
FIG. 1 illustrates an agricultural environment showing the agricultural fan control system, the present invention, therein.

FIG. 1 illustrates a plan view of an agricultural fan control system 10 including an electrical modulator control housing 12, a sensor 14, and load fan motors 16 and 18 in a barn 20. A line cord 22 connects to the modulator electrical control housing 12 which is waterproof and dustproof.

Figure 2:
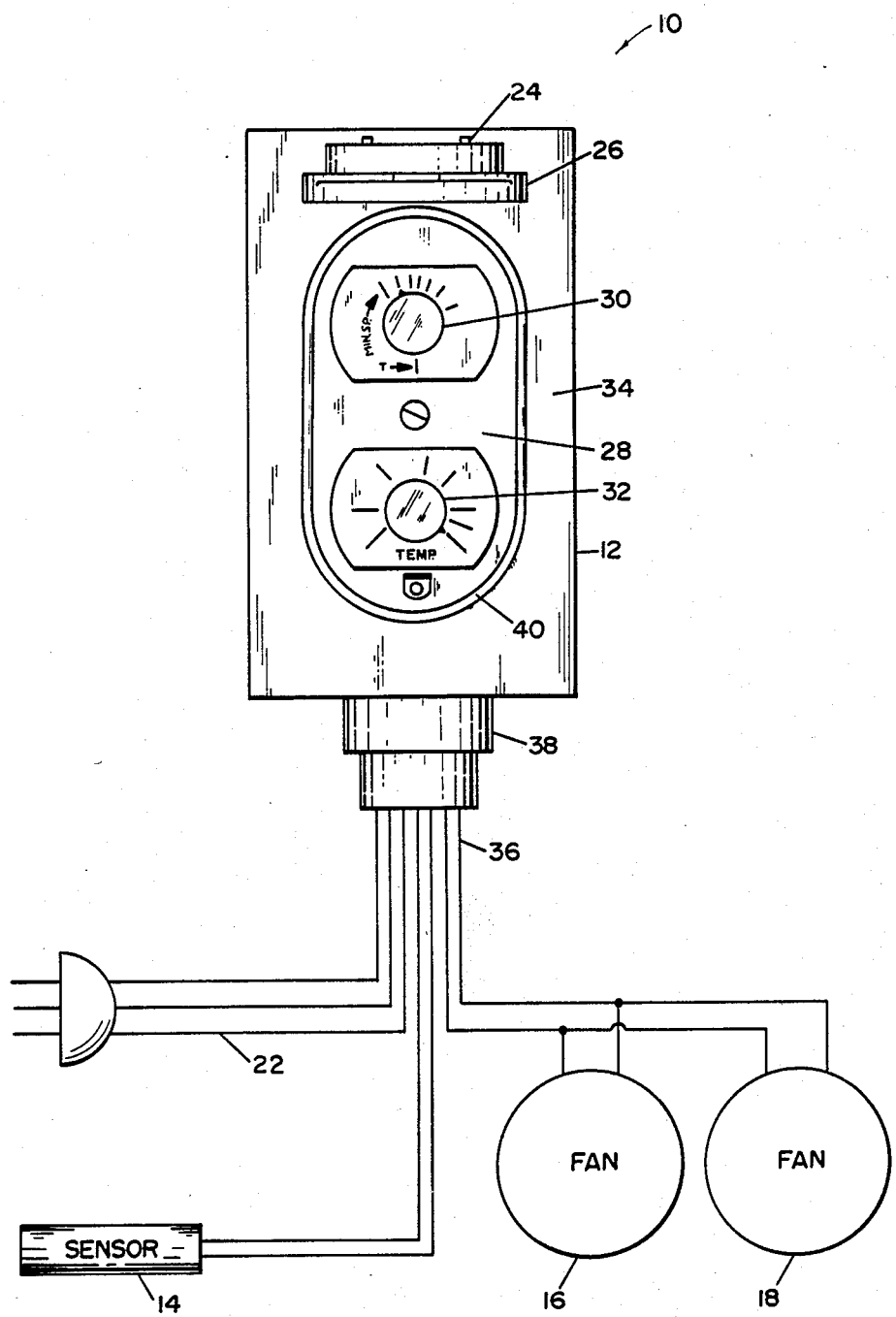
FIG. 2 illustrates a front view of a box enclosing the electrical circuit.

FIG. 2 illustrates a front view of the modulator electrical control box 12 with a flip cover 26 at hinges 24 flipped in an upright position. A panel 28 supports a fan speed switch 30, a temperature switch 32, and positions behind an outer cover 34. A plurality of color-coded wires 36 extend out from the bottom of a junction 38. The box 12 can be die-cast, the panel 28 can be screwed on and the cover 26 can be spring-hinged to encompass the outer cover 34 with a gasket 40 therebetween.

Figure 3:
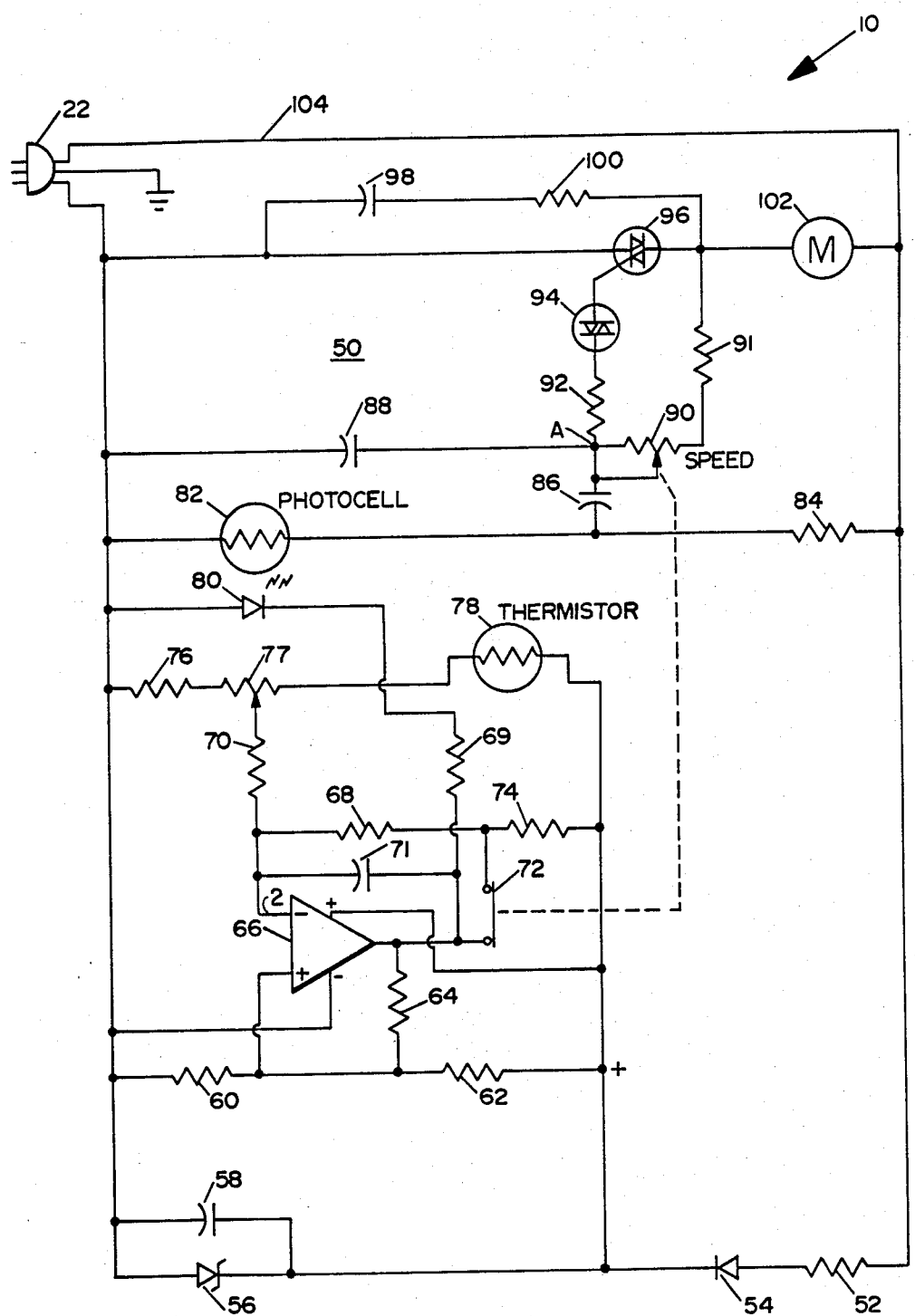
FIG. 3 illustrates an electrical circuit schematic of the present invention.

FIG. 3 illustrates an electrical circuit schematic of the agricultural fan control system 10 where the circuit 50 includes power supply components 52-58 including a voltage dropping resistor 52, a rectifier 54, the zener diode 56, and a filter capacitor 58. These components maintain voltage regulation. Resistors 60 and 62 are voltage dividers operating in conjunction with the operational amplifier 66 with feedback resistors 64 and 68. Resistor 70 is an input limiting resistor. Switch 72 is coupled to the speed variable resistor 90 which is a speed control 30. Resistor 74 connects to the switch 72 and resistor 68 and other components, as illustrated. Resistor 76 is a bridge resister and variable bridge resistor 77 connects accordingly. The thermistor 78 is the temperature sensor 14. An LED 80 connects at the top side of the low-voltage portion of the circuit to a photocell 82 which is on the bottom side of the high-voltage portion of the control circuit. A phase control resistor 84, a phase control control capacitor 86, a phase control capacitor 88, and a phase control variable resistor which is the fan control 30 connect accordingly in the portion of the high-voltage side of the power circuit. A gate current line resistor 92 connects to a diac 94 which connects to the gate of a triac 96. The commutating capacitor 98 which limits peak transients during synchronized switching connects in series with a commutating network resistor 100 across the triac 96. A motor 102 representing a fan or a plurality of fans connects between the triac and one side 104 of the line voltage 22.

MODE OF OPERATION

In the thermostat mode, the switch 72 is off. The difference on the inputs of the op-amp 66 is amplified by the feedback of the ratios of resistors 64, 62, and 60 where pin 2 is the inverting input of op-amp 66. A resistor bridge is formed by resistors 60, 62, 76, 77, and 78 where the imbalance of the bridge is amplified by the op-amp 66 to turn on LED 80 which is proportional to the balance. The photocell 82 becomes a variable resistor as a function of the bridge imbalance where the actual photo effect takes place and isolates the low-voltage sensitive circuit from the high-voltage power circuit.

In the manual constant speed adjustment, the variable resistor 90 determines the speed with the switch 72 on, the resistor 74 is connected which allows the operational amplifier 66 to control the LED 80. The switch 72 is open, the LED 80 is now completely controlled by the op-amp 66, capacitor 71, resistors 69, 70, 76, and 77, and thermistor 78. If the inverting input to the op-amp is negative, the output will swing positive and the LED will go into full illumination, resulting in minimum resistance of the photocell 82 affecting the phase shift of the network of capacitor 86 and parallel with capacitor 88. If the inverting input is positive, the output will swing negative and the LED will be at zero illumination, which makes the photocell 82 go to maximum resistance.

The constant speed determined by the phase relationship of the trigger circuit comprising the capacitor 88 and the variable resistor 90 where the value of the variable resistor determines instantaneous voltage between point A of the RC network and the applied power line voltage. If the instantaneous power line voltage exceeds the value applied at the gate of the triac 96, the phase displacement network turns the triac on.

In manual operation or to set minimum hand speed, the temperature lower knob is turned clockwise as far as it will go and then the upper knob for fan speed is set for the desired fan speed. In thermostat operation, the upper knob is turned to T and the lower knob is set to the desired temperature for turning the fan on and off.

In automatic operation, the lower temperature knob is turned to the desired temperature. The fan will modulate based upon temperature but will not go below minimum speed on an upper knob setting. The voltage curve for the modulating setting for fan operation for air flow of minimum to maximum cubic feet per minute is based on a 7° temperature rise fahrenheit, by way of example and for purposes of illustration only, and not to be considered as limiting of the present invention. The voltage curve is inverted and slower so that there is a slower fan speed increase on the first five degrees than the last two degrees of the temperature rise fahrenheit. This has its greatest advantage where supplementary heat is needed, so the fan does not work against the heat source and waste fuel. The minimum setting allows a constant minimum air movement.

The fan motors are powered at a slower speed over the first five degrees of temperature rise and at a faster speed for the last two degrees of temperature rise fahrenheit. As the temperature increases over the predetermined set point, the speed increases and is controlled by the operational amplifier which fires the triac. The variable resistor sets the fan speed while the Wheatstone bridge sets the temperature through the variable resistor.

The fan speed is controlled through the brilliance of the photocell which goes from a dark condition to maximum brilliance for the first five degrees fahrenheit, and then the remainder of the curve is determined by the fixed resistor 69 for sweeping through the remainder of the curve.

The operation of the fan is directly proportional to the inverting log emitter operational amplifier for firing the triac and is dependent upon increasing brilliance function of the LED and photocell combination for increasing the speed of the fan.

Various modifications can be made to the present invention without departing from the apparent scope thereof. The temperature ranges can be varied accordingly, depending upon the particular climates of operation or the particular conditions for agricultural usage.

Having thus described the invention, what is claimed is:

1. Agricultural fan motor control system comprising:
   a. low-voltage control circuit means including temperature setting variable resistor, temperature sensing means in a top leg of a Wheatstone bridge, the leg also including said temperature setting variable resistor for setting desired level of temperature, and an operational amplifier connected between one bottom leg of said bridge and a wiper arm of said temperature setting variable resistor and output of an operational amplifier connected to a LED means transmitting an output signal proportionally inverted resistance of said temperature sensing means, and a resistor connected between an output of said operational amplifier and a junction of bottom legs of said Wheatstone bridge;
   b. high-voltage phase controlled power circuit means including a photocell for receiving said output signal from said LED means and means for providing a speed control signal, said photocell and a phase control resistor connected in series between an AC power source means, a junction of said photocell and said phase control resistor connected to a wiper arm and one side of a speed variable control resistor through a capacitor;
   c. triac switching means connected between said AC power source means and a fan motor means, and a gate of said triac switching means connected to said speed control signal through said speed variable control resistor for controlling speed of said fan motor means through said triac switching means, said fan motor means connected between said triac switching means and one side of said power source means; and,
   d. modulating means including said operational amplifier and one side of said temperature sensing means connected thereto, and a switch connecting between an output of said operational amplifier and a feedback resistor connected across said operational amplifier for switching said modulating means in and out of said low-voltage control circuit means for modulating said speed control signal with respect to an inverted voltage curve for a slower fan motor means speed control signal for a first five degrees Fahrenheit of temperature rise and a faster fan motor means speed control signal for a second two degrees temperature rise of seven degrees of temperature rise, said speed variable resistor connected to said triac switching means providing a minimum fan motor means speed control signal and said speed variable resistor including a connected switch for turning off said modulating means providing for a fan motor means speed signal at a predetermined air movement when a predetermined temperature is exceeded thereby maintaining a predetermined temperature and predetermined air movement.

2. System of claim 1 wherein said motor means comprises at least one agricultural fan.

3. System of claim 1 wherein said motor means comprises at least two agricultural fans.

* * * * *